J. ARMSTRONG.

FEED-WATER HEATER AND FILTER.

No. 6,891. Reissued Feb. 1, 1876.

Attest;
Joe. Peyton,
Baltis DeLong.

Inventor;
James Armstrong
by his Attorney
W. D. Baldwin

N. PETERS, PHOTO-LITHOGRAPHER, WASHINGTON, D. C.

UNITED STATES PATENT OFFICE.

JAMES ARMSTRONG, OF TOLEDO, OHIO.

IMPROVEMENT IN FEED-WATER HEATERS AND FILTERS.

Specification forming part of Letters Patent No. 81,971, dated September 8, 1868; reissue No. 3,834, dated February 15, 1870; reissue No. 6,891, dated February 1, 1876; application filed March 13, 1873.

*To all whom it may concern:*

Be it known that I, JAMES ARMSTRONG, formerly of Bucyrus, in the county of Crawford and State of Ohio, but now of Toledo, in the county of Lucas, in said State, have invented certain new and useful Improvements in Heaters and Filters for Heating, Purifying, and Filtering Water; and I do hereby declare that the following is a full, clear, and exact description thereof, reference being had to the accompanying drawings, in which—

Figure 1:
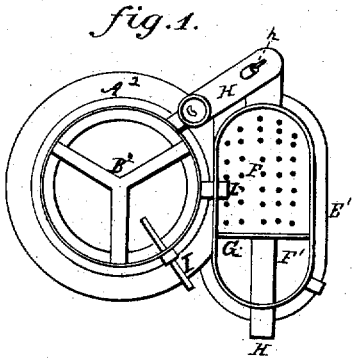
Figure 2:
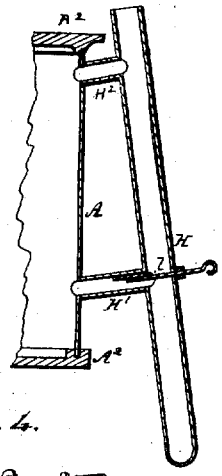
Figure 3:
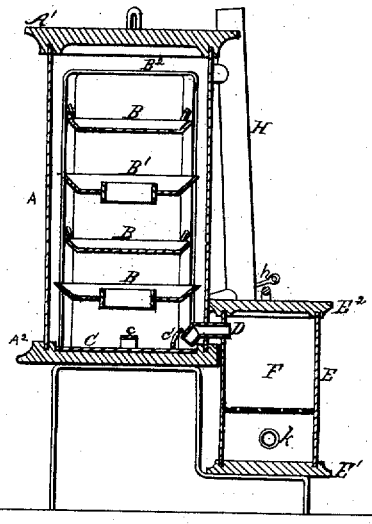
Figure 4:
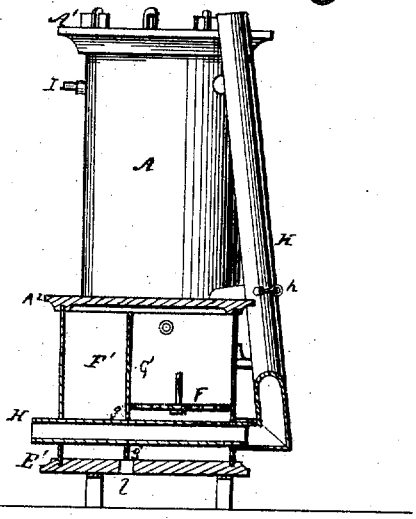
Figure 5:
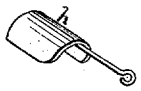

Figure 1 represents a plan or top view of the apparatus, with the covers of the heater and filter removed; Fig. 2 a vertical section, through a portion of the heater and the steam-pipes; Fig. 3, a similar section through the heater and filter; Fig. 4, a side elevation of the heater, with the filter in section, and Fig. 5 a view of the regulator-valve.

The heater-chamber is composed of a steam-tight shell or cylinder, A, having closely-fitting heads $A^1$ $A^2$, the upper one of which is made removable, to allow the pans to be removed or replaced. These pans B $B^1$ are arranged one above the other in the heater-chamber, and for convenience in handling are secured to a frame, $B^2$, resting on the bottom of the chamber. They are, it will be observed, of two sizes, the smaller ones having solid bottoms and low sides, so that the feed-water may flow over them, while the alternate larger ones have short pipes or collars inserted in their bottoms, through which pipes the feed-water flows, thus causing it to flow over the entire surface of the pans. A disk, C, rests loosely upon the bottom head of the heater, and is provided with a handle, *c*, by which it may be removed or replaced. It is also provided with a flange or shield, $c^1$, which incloses the mouth of an overflow-pipe, D, the mouth of which pipe is bent down so as to draw off the water in the heater at a point some distance below the water-line. The shield prevents the deposit of sediment around the mouth of the pipe, while any oil that may be brought by the exhaust steam from the engine into the heater, will float upon the surface of the water, and thus be prevented from passing into the filter or boilers, in which latter it tends to produce priming. As the water-level is necessarily as high as the upward bend of the overflow-pipe D, it follows that the water itself acts as a seal to prevent the access of steam to the filter, which is another advantage incident to my invention. The overflow-pipe D opens into a filter-chamber, consisting of a shell, E, with heads $E^1$ $E^2$, constructed in a manner similar to the heater. The head $E^2$ is likewise made removable to afford convenient access to the filter-chamber, which is divided internally into two compartments, F $F^1$, by a vertical diaphragm or partition, G, having perforations *g* near its bottom; the filtered water is thus allowed to flow from the filter-chamber F to the hot-well $F^1$, whence it is pumped into the boiler. The steam-pipe H is shown in the drawings as passing through the filter-chamber and hot-well, in order to impart a still higher degree of heat to the feed-water after passing from the heater-chamber, if found expedient, but ordinarily the water will be hot enough without this arrangement. The steam-pipe communicates with the heater-chamber, and its upper end is open to permit of the escape of the waste steam. The lower branch $H^1$ of this pipe enters the heater near the bottom of the tier of pans, and is provided with a semi-cylindrical valve, *h*, with a rounded end. This valve fits and slides in the pipe $H^1$, and across the main pipe H, thus enabling the engineer to control the admission of steam to the heater. The upper branch pipe $H^2$ is an exit-pipe merely, and serves only to conduct the waste steam to the escape-pipe, formed by the upper open part of the pipe H.

The operation of my invention is as follows: The feed-water flows through a pipe, I, into the upper pan of the series, and overflows it into the next one, and so on until all the pans are full of water, in a comparatively quiescent state, as the overflow takes place very gradually, and in thin sheets or sprays. Steam admitted through the pipe H $H^1$ in regulated quantities heats the water, which causes the deposition of lime and such like constituents held in solution in it. After passing over the pans the water accumulates in the bottom of the cylinder, rising above the level of the pipe D, as above explained, where it has a chance to deposit the heavier portion of its sediment before passing into the filter F, which filter, it will be observed, is of comparatively large area. After being filtered it flows into the hot-well through the perforated diaphragm G, as hereinbefore set forth, and passes to the pump through the pipe *k*, Fig. 3.

I claim—

1. A feed-water heater and filter, composed substantially of a series of heating and depositing pans, a sediment-collecting chamber and a filter-chamber, arranged in such relation to each other that the water is first passed successively over the pans for heating by steam for the deposit of crystallizable salts, thence into a sediment-chamber, where the heavier elements settle, and from which it passes through filtering material in a filter-chamber of large area, where the remaining separable impurities are removed, substantially as hereinbefore set forth.

2. The combination, in a feed-water heater and filter, of a series of pans over which the water flows, a steam-pipe, and a valve to regulate the admission of steam to the pans, substantially as set forth.

JAMES ARMSTRONG.

Witnesses:

JOE I. PEYTON,

E. C. DAVIDSON.